US009344310B2

(12) United States Patent
Lee et al.

(10) Patent No.: US 9,344,310 B2
(45) Date of Patent: May 17, 2016

(54) APPARATUS AND METHOD FOR PERFORMING PROPERRIZING FREQUENCY SHIFT(P-FRESH) VECTORIZING

(75) Inventors: Daewon Lee, Anyang-si (KR); Jeongho Yeo, Pohang-si (KR); Byungwook Han, Pohang-si (KR); Byounghoon Kim, Anyang-si (KR); Joonho Cho, Pohang-si (KR)

(73) Assignees: LG ELECTRONICS INC., Seoul (KR); POSTECH ACADEMY-INDUSTRY FOUNDATION, Pohang-Si (KR)

( * ) Notice: Subject to any disclaimer, the term of this patent is extended or adjusted under 35 U.S.C. 154(b) by 78 days.

(21) Appl. No.: 14/002,928

(22) PCT Filed: Oct. 13, 2011

(86) PCT No.: PCT/KR2011/007619

§ 371 (c)(1),
(2), (4) Date: Sep. 3, 2013

(87) PCT Pub. No.: WO2012/144704

PCT Pub. Date: Oct. 26, 2012

(65) Prior Publication Data

US 2013/0336425 A1 Dec. 19, 2013

Related U.S. Application Data

(60) Provisional application No. 61/476,326, filed on Apr. 18, 2011.

(51) Int. Cl.

| | |
|---|---|
| ***H04L 27/12*** | (2006.01) |
| ***H04L 25/03*** | (2006.01) |

(Continued)

(52) U.S. Cl.

CPC .......... *H04L 27/12* (2013.01); *H04L 25/03993* (2013.01); *H04L 27/0006* (2013.01); *H04L 27/02* (2013.01); *H04L 27/18* (2013.01); *H04L 27/34* (2013.01)

(58) Field of Classification Search

CPC ..... H04B 7/12; H04L 25/03159; H04L 5/006
USPC ........................................ 375/303, 316, 343
See application file for complete search history.

(56) References Cited

U.S. PATENT DOCUMENTS

| | | | |
|---|---|---|---|
| 2009/0312028 | A1 | 12/2009 | Burchfiel |
| 2010/0124266 | A1 | 5/2010 | Cho et al. |

(Continued)

OTHER PUBLICATIONS

Schreier, Peter, et al. "Detection and Estimation of Improper Complex Random Signals." IEEE Transactions on Information Theory, vol. 51, No. 1, Jan. 2005. pp. 306-312.*

(Continued)

*Primary Examiner* — David S Huang

(74) *Attorney, Agent, or Firm* — Birch, Stewart, Kolasch & Birch, LLP

(57) ABSTRACT

To achieve these and other advantages and in accordance with the purpose of the present invention, as embodied and broadly described herein, there is provided a method for performing properizing frequency shift (p-FRESH) vectorizing, the method comprising: converting a scalar-valued input signal of length L into a 2L-by-1 vector-valued output signal including complex conjugate signal of the input signal; modulating the input signal and the complex conjugate signal each with L different carriers; and bandpass filtering the modulated signal to form the output signal, wherein the output signal is band-limited to a half-Nyquist zone ($F^+$).

8 Claims, 4 Drawing Sheets

(51) Int. Cl.

*H04L 27/00* (2006.01)
*H04L 27/02* (2006.01)
*H04L 27/18* (2006.01)
*H04L 27/34* (2006.01)

(56) References Cited

U.S. PATENT DOCUMENTS

2010/0173589 A1 7/2010 Han et al.
2011/0051845 A1* 3/2011 Schmidl et al. ............... 375/299
2012/0182948 A1* 7/2012 Huang et al. .................. 370/329

OTHER PUBLICATIONS

Schreier, Peter. et al. "A Generalized Likelhood Ratio Test for Impropriety of Complex Signals." IEEE Signal Processing Letters, vol. 13, No. 7, Jul. 2006. pp. 433-436.*

Ollila, Esa. "On the Circularity of a Complex Random Variable." IEEE Signal Processing Letters. vol. 15, 2008. pp. 841-844.*

Schreier et al., "Second-Order Analysis of Improper Complex Random Vectors and Processes," IEEE Transactions on Signal Processing, vol. 51, No. 3, Mar. 3, 2003, 12 pages.

* cited by examiner

APPARATUS AND METHOD FOR PERFORMING PROPERRIZING FREQUENCY SHIFT(P-FRESH) VECTORIZING

CROSS REFERENCE TO RELATED APPLICATIONS

This application is the National Phase of PCT/KR2011/007619 filed on Oct. 13, 2011, which claims priority under 35 U.S.C. 119(e) to U.S. Provisional Application No. 61/476,326 filed on Apr. 18, 2011, all of which are incorporated by reference herein in its entirety.

TECHNICAL FIELD

The present disclosure relates to a wireless access system, and more particularly, an apparatus and method for performing properizing frequency shift (p-FRESH) vectorizing.

BACKGROUND ART

Spectrum resources for wireless communications are very limited and most of them have been already assigned to licensed users. However, it turns out that spectrum bands are sparsely utilized temporally and spatially.

A cognitive radio aims at improving the spectral efficiency by allowing a secondary user to opportunistically utilize such spectrum resources.

Thus, spectrum sensing to check if the spectrum band of interest is occupied becomes one of the most important tasks of a secondary user to avoid the interference to a primary user.

Interference in wireless channels are usually modeled by a wide-sense stationary (WSS) random process. However, an information-bearing signal is often better modeled by a wide-sense cyclostationary (WSCS) random process, of which properties have been intensively investigated in communications and signal processing.

The second-order cyclostationarity (SOCS) is defined by the periodicity of the mean, the autocovariance, and the complementary auto-covariance functions with a common period. In particular, if the complementary auto-covariance function does not vanish, the SOCS random process becomes an improper-complex SOCS process.

Such an improper-complex SOCS random signal is observed when the primary user transmits an improper-complex second-order stationary data sequence using a linear modulation scheme such as pulse amplitude modulation (PAM), quadrature amplitude modulation (QAM), single sideband (SSB), vestigial sideband (VSB), and minimum shift keying (MSK) modulations. It is noteworthy that the second-order cyclostationarity combined with the impropriety exhibits periodic and symmetric spectral correlation.

A number of presence detection techniques have been developed to perform spectrum sensing for cognitive radios.

These are roughly classified as a matched filter detector, an energy detector, a cyclostationary feature detector, and their variants. Although the matched filter detector offers a better detection performance, it requires the perfect knowledge on the primary-user signal and its timing. The energy detector has the simplest structure. However, it suffers from poor performance and high sensitivity to the uncertainty in the noise variance.

To the contrary, the cyclostationary feature detector exploits only the second-order statistical properties of the primary-user signal but shows better robustness to the uncertainty in the noise variance.

DISCLOSURE OF INVENTION

Technical Problem

In the present invention, the optimal detection of an improper-complex SOCS random signal is considered in the presence of an additive white Gaussian noise. The detection of a real passband WSCS random process is thoroughly examined, and the optimal detection of an improper-complex random vector and an improper-complex non-stationary random process is intensively studied.

However, the optimal detector for a real passband WSCS random process that specifically leads to an improper-complex SOCS complex envelope has not been reported yet. Unlike the complex envelope of a general real passband WSCS random process, an improper-complex SOCS complex envelope exhibits both periodic and symmetric correlations in the frequency domain.

To efficiently utilize this structure, we employ a linear timevarying (LTV) operator called properizing FREquency SHift (p-FRESH) vectorizer, which converts the improper-complex SOCS random process into an equivalent proper-complex vector WSS random process.

By exploiting the wide-sense propriety of the p-FRESH vectorizer, we reformulate the detection problem in the frequency domain and derive the optimal detector as a likelihood ratio test (LRT). Unlike the ordinary cyclostationary feature detection that utilizes the non-zero spectral correlation function (SCF) evaluated at the cycle frequencies of the passband process, the LRT is in the form of an estimator-correlator that precisely shows how the eigenvectors and the eigenvalues of the power spectral density (PSD) matrix of the p-FRESH vectorizer output are utilized in the optimum detection.

To efficiently implement the optimal detector, a near-optimal practical detector structure is also proposed that over-samples the observation in the time domain and block-processes it and its complex conjugate in the frequency domain. It is shown that the proposed detector significantly improves the detection performance by efficiently exploiting both the cyclostationarity and the impropriety of the improper-complex SOCS random signal.

Solution to Problem

In the present invention, the optimal detection of an impropercomplex second-order cyclostationary (SOCS) random signal is considered in the presence of an additive white Gaussian noise.

To efficiently utilize the periodic and the symmetric spectral correlations in the signal, a linear time-varying operator called properizing FREquency SHift (p-FRESH) vectorizer is employed, which converts the SOCS random process into an equivalent vector wide-sense stationary random process.

The optimal likelihood ratio test is then derived in the frequency domain in the form of an estimator-correlator. A near-optimal practical detector structure is also proposed, which over-samples the observation in the time domain and block-processes it in the frequency domain in order to approximate the optimal detector.

Numerical results show that the proposed detector significantly improves the detection performance by exploiting both the cyclostationarity and the impropriety of the improper-complex SOCS random signal.

To achieve these and other advantages and in accordance with the purpose of the present invention, as embodied and broadly described herein, there is provided a method for performing properizing frequency shift (p-FRESH) vectorizing, the method comprising: converting a scalar-valued input signal of length L into a 2L-by-1 vector-valued output signal including complex conjugate signal of the input signal; modulating the input signal and the complex conjugate signal each with L different carriers; and bandpass filtering the modulated signal to form the output signal, wherein the output signal is band-limited to a half-Nyquist zone ($F^+$).

In one exemplary embodiment, wherein the output signal is defined by following expression.

$$Y_l(t) = \begin{cases} (X(t)e^{-2j\pi f_l t}) * g(t), & \text{for } l \le L \\ (X(t)^* e^{-2j\pi f_{l-L} t}) * g(t), & \text{for } l > L \end{cases}$$

where X(t) is the input signal, X(t)* is the conjugation of the input signal, g(t) is the impulse response bandpass filtering a half-Nyquist zone ($F^+$), $Y_l(t)$ is the output signal, l=1, 2, . . . , 2L.

In another embodiment, wherein a fourier transform G(f) of the g(t) is defined by following expression.

$$G(f) = \begin{cases} 1, & \forall f \in \mathcal{F}^+ \\ 0, & \text{elsewhere} \end{cases}$$

In another embodiment, wherein the input signal has zero-mean, and the output signal is proper-complex zero-mean vector-WSS process when the reference rate has integer values of the cycle period of the input signal.

In another embodiment, wherein the output signal is jointly WSS, and an auto-correlation function of the output signal has second-order property of the input signal.

To achieve the above object, there is also provided an apparatus for detecting an improper-complex second-order cyclostationary (SOCS) random signal in a cognitive radio system, the apparatus comprising: a properizing frequency shift (p-FRESH) vectorizer configured to convert a improper-complex SOCS random process into a proper-complex vector wide-sense stationary (WSS) random process, wherein the p-FRESH vectorizer converts a scalar-valued input signal of length L into a 2L-by-1 vector-valued output signal, wherein the output signal is defined by following expression.

$$Y_l(t) = \begin{cases} (X(t)e^{-2j\pi f_l t}) * g(t), & \text{for } l \le L \\ (X(t)^* e^{-2j\pi f_{l-L} t}) * g(t), & \text{for } l > L \end{cases}$$

where X(t) is the input signal, X(t)* is the conjugation of the input signal, g(t) is the impulse response bandpass filtering a half-Nyquist zone ($F^+$), $Y_l(t)$ is the output signal, l=1, 2, . . . , 2L.

In one exemplary embodiment, wherein a fourier transform G(f) of the g(t) is defined following expression.

$$G(f) = \begin{cases} 1, & \forall f \in \mathcal{F}^+ \\ 0, & \text{elsewhere} \end{cases}$$

In another embodiment, wherein the input signal has zero-mean, and the output signal is proper-complex zero-mean vector-WSS process when the reference rate has integer values of the cycle period of the input signal.

In another embodiment, wherein the output signal is jointly WSS, and an auto-correlation function of the output signal has second-order property of the input signal.

Advantageous Effects of Invention

By exploiting the wide-sense propriety of the p-FRESH vectorizer, we reformulate the detection problem in the frequency domain and derive the optimal detector as a likelihood ratio test (LRT).

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
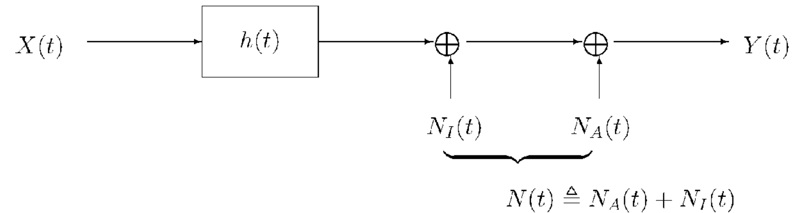
FIG. 1 shows its equivalent channel model in complex baseband.

Exemplary embodiments of the present invention will now be described in detail with reference to the accompanying drawings. The same reference numerals will be used throughout to designate the same or like components and a repeated description will be omitted. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components. The accompanying drawings, which are given by illustration only, and thus are not limitative of the present invention.

A communication system according to an exemplary embodiment of the present invention is a system for providing various communication services such as voice data, packet data, and the like, which may include a base station and a terminal.

The terminal according to an exemplary embodiment of the present invention may also be referred to as subscriber station (SS), user equipment (UE), mobile equipment (ME), mobile station (MS), and the like, and may include a portable device having a communication function such as a mobile phone, a PDA, a smart phone, a notebook, and the like or a non-portable device such as a PC or a vehicle-mounted device.

The base station (BS) refers to a fixed position communicating with the terminal and may also be referred to as eNB (evolved-NodeB), base transceiver system (BTS), access point (AP), and the like. One or more cells may exist in one base station, and an interface for transmitting user traffic or control traffic may be used between base stations. Downlink refers to a communication channel from the BS to the terminal, and uplink refers to a communication channel from the terminal to the BS.

A multiple access scheme applied to the wireless communication system according to an exemplary embodiment of the present invention includes any multi-access scheme such as a code division multiple access (CDMA), a time division multiple access (TDMA), a frequency division multiple access (FDMA), a single carrier-frequency division multiple access (SC-FDMA), an orthogonal frequency division multiple access (OFDMA), and the like.

Multiple access methods for downlink and uplink transmission may differ, and for example, downlink may employ an OFDMA scheme while uplink may employ an SC-FDMA scheme.

Embodiments of the present invention will be described below in detail with reference to the accompanying drawings, where those components are rendered the same reference number that are the same or are in correspondence, regardless of the figure number, and redundant explanations are omitted.

Signals transmitted through wireless channels are susceptible to various types of noise and interference. In many cases, the interference is well modeled by a wide-sense stationary (WSS) random process. However, man-made interference such as co-channel and adjacent channel interference is often much accurately modeled by a wide-sense cyclostationary (WSCS) random process. For example, pulse amplitude modulation (PAM) or quadrature amplitude modulation (QAM) of a WSS data sequence results in a WSCS signal in general.

Cyclostationarity has been noticed as an important classifier for random processes that are encountered in communications and signal processing. One of the seminal features of a cyclostationary random process is that it exhibits spectral correlation as well as temporal correlation. To efficiently characterize such structural properties, a scheme called the harmonic series representation (HSR) of a cyclostationary random process is proposed. The HSR scheme have been intensively used, either implicitly or explicitly, in signal design and parameter estimation. This includes the generalized Nyquist criterion to design a set of bandlimited orthogonal pulses, the optimal transmit pulse design for PAM, QAM, or direct-sequence spread-spectrum (DS/SS) modulated systems with linear receivers, the cyclic Wiener filtering of a cyclostationary random process, and the sparse representation of shift-invariant signals. This scheme is also used for joint transmitter and receiver optimizations in additive WSCS noise. However, only the minimization of the mean squared error (MSE) at the linear receiver output is considered to design the optimal transmit and receive waveforms of the QAM signaling format with a WSS proper-complex data sequence.

For a continuous-time, band-limited, linear time-invariant channel corrupted only by an additive stationary Gaussian noise, its capacity and capacity-achieving input distribution are both well known. The optimal input distribution that maximizes the throughput turns out to be WSS and Gaussian as the additive noise. Depending on the noise power spectral density (PSD) and the channel gain, the optimal solution allocates the transmit power in the frequency domain through a geometric procedure called water filling. For the same single-input single-output (SISO) channel, however, no capacity result is available if the Gaussian noise is no longer stationary but cyclostationary. Neither the channel capacity nor the optimal input distribution and associated power allocation scheme is discovered yet.

In the present invention, we derive the capacity of a continuous-time, SISO, frequency-selective, bandlimited, linear time-invariant (LTI) channel, whose output is corrupted by a second-order cyclostationary (SOCS) complex Gaussian noise. An SOCS complex random process is defined as a complex random process whose auto-covariance and complementary auto-covariance (a.k.a. pseudo-covariance) functions both exhibit periodicity with a common period. It can be easily shown that, under certain conditions, PAM, QAM, and their variants such as single sideband (SSB) PAM, vestigial sideband (VSB) PAM, minimum shift keying (MSK), staggered quaternary phase-shift keying (SQPSK), DS/SS modulation, and some forms of orthogonal frequency division multiplexing (OFDM) all result in SOCS complex envelopes.

The Gaussian assumption not only makes the problem mathematically tractable but also is well justified if the additive noise consists of an ambient white Gaussian noise and a worst-case jamming signal. It is well known that, as the Gaussian noise minimizes the capacity of a discrete-time memoryless channel given a noise power, the worst-case jammer chooses to transmit a Gaussian jamming signal given second-order statistics of the interference. It can be shown that the Gaussianity of the worst-case jamming signal also applies to our case with an SOCS interference. Of course, this assumption does not hold in general when the interference is generated by a co-channel or an adjacent channel communicator with a finite symbol constellation of small cardinality. However, the channel capacity and the capacity-achieving scheme derived in this paper can still serve well as a lower bound and a reference system, respectively, for general non-Gaussian SOCS noise channels.

Motivated by the HSR that leads to the equivalence between a continuous-time WSCS process and jointly WSS processes, we convert the SISO channel to an equivalent multiple-input multiple-output (MIMO) channel by placing a linear-conjugate linear time-varying (LCL-TV) operator and its inverse at the output and the input of the channel, respectively. Unlike the conventional HSR-based linear time-varying operator such as that used in, this operator always generates a proper-complex vector-WSS random process regardless of the propriety of the SOCS noise input.

A variational problem is then formulated in the frequency domain to find the capacity of the MIMO channel. Using the capacity results on MIMO communications, the optimal input distribution to the equivalent MIMO channel is obtained through the water filling procedure for parallel Gaussian channels. It turns out that the corresponding optimal input to the SISO channel is SOCS and Gaussian with the same cycle period as the noise. It is shown that the proposed water filling significantly improves the spectral efficiency by exploiting the spectral correlation of the noise.

Channel Model and Problem Formulation

The continuous-time band-limited additive SOCS complex Gaussian noise channel is described and the problem is formulated. We consider communicating over a real passband channel. FIG. 1 shows its equivalent channel model in complex baseband. The channel input X(t) passes through a frequency-selective channel modeled by an LTI filter with impulse response h(t), and is received in the presence of an additive noise N(t). Thus, the channel output Y (t) is given by $$Y(t)-X(t)*h(t)+N(t), \tag{1}$$

where the operator * denotes the convolution integral.

To proceed, we define the following terms.

Definition 1: The mean, the auto-covariance, and the complementary auto-covariance functions of a complex random process X(t) are defined, respectively, as $$\mu_X(t)\triangleq \mathbb{E}\{X(t)\}, \tag{2a}$$

$$c_X(t,s)\triangleq E\{(X(t)-\mu_X(t))(X(s)-\mu_X(s))^*\}, \text{ and} \tag{2b}$$

$$\tilde{c}_X(t,s)\triangleq E\{(X(t)-\mu_X(t))(X(s)-\mu_X(s))\}, \tag{2c}$$

where the operator $E\{\cdot\}$ denotes the expectation and the superscript * denotes the complex conjugation.

Definition 2: A complex random process X(t) is called proper if its complementary auto-covariance function vanishes, i.e., $\tilde{c}_X(t, s)-0$, ∀t, ∀s, and is called improper otherwise.

Definition 3: A complex random process X(t) is SOCS with cycle period T>0 if μX(t)=μX(t+T), cX(t, s)=cX(t+T, s+T), and $\tilde{c}_X(t, s)-\tilde{c}_X(t+T, s+T)$, ∀t, ∀s.

The second-order cyclostationarity is motivated by the second-order stationarity as $\mu_X(t)=\mu_X(t+\tau)$, $c_X(t, s)=c_X(t+\tau, s+\tau)$, and $\tilde{c}_X(t, s)=\tilde{c}_X(t+\tau, s+\tau)$, ∀t, =s, ∀τ.

Note that, like the second-order stationarity, the second-order cyclostationarity is defined in terms of the complementary auto-covariance function as well as the auto-covariance function.

It is assumed that the additive noise consists of an ambient noise and an interfering signal, i.e., $$N(t)\triangleq N_A(t)+N_I(t), \tag{3}$$

where the ambient noise $N_A(t)$ is modeled as a proper-complex white Gaussian noise. The interfering signal $N_I(t)$ is modeled as a zero-mean SOCS Gaussian random process with cycle period $T_0>0$.

Such an SOCS interference can be observed when there is a co-channel or an adjacent channel user that transmits a second-order stationary proper- or improper-complex data sequence using a linear modulation scheme such as double sideband (DSB) PAM, SSB PAM, VSB PAM, QAM, MSK, SQPSK, etc. Note that these linear modulation schemes are among the most popular digital modulation schemes and that their complex envelopes are all in the form of $$N_I(t) = \sum_{n=-\infty}^{\infty} \{c_1[n]p_1(t-nT_0) + jc_2[n]p_2(t-nT_0)\}, \tag{4}$$

where j denotes $\sqrt{-1}$'$(c_1[n])_n$, and $(c_2[n])_n$ are jointly WSS real-valued random data sequences, and $p_1(t)$ and $p_2(t)$ are waveforms that includes the effect of the transmit waveforms and the channel.

Then, it is straightforward to show that the joint wide-sense stationarity of $(c_1[n])_n$ and $(c_2[n])_n$ is equivalent to the second-order stationarity of $(c_1[n]+jc_2[n])_n$, and that, by Definition 3, $N_I(t)$ in (4) is SOCS with cycle period $T_0$.

As mentioned in the previous section, the Gaussian assumption is fully justified when the interference is the worst-case jamming signal.

Although this is not the case in general, the capacity and the capacity-achieving scheme obtained under this assumption can be used, respectively, as a lower bound on the channel capacity and a reference system, of which performance any well-designed system for a non-Gaussian SOCS interference must exceed.

Since the overall additive noise N(t) is now a zero-mean SOCS Gaussian random process with cycle period $T_0$, the second-order statistics of N(t) satisfy $$\mu_N(t)\triangleq \mathbb{E}\{N(t)\}=0, \tag{5a}$$

$$r_N(t,s)\triangleq \mathbb{E}\{N(t)N(s)^*\}=r_N(t+T_0,s+T_0), \text{ and} \tag{5b}$$

$$\tilde{r}_N(t,s)\triangleq \mathbb{E}\{N(t)N(s)\}=\tilde{r}_N(t+T_0,s+T_0),\forall t,\forall s, \tag{5c}$$

$\gamma_N(t,s)$ and $\tilde{r}_N(t,s)$ are called the auto-correlation and the complementary auto-correlation functions, respectively.

It is also assumed that the channel and the noise are band-limited to f∈[−B0,B0), where and in what follows the left-end is included but the right-end is not included in a frequency interval just for convenience and consistency.

Let H(f), $R_N(f,f')$ and $\tilde{R}_N(f, f')$ be the Fourier transform of h(t), the double Fourier transform of $\gamma_N(t,s)$ and the double Fourier transform of $\tilde{r}_N(t,s)$ respectively, i.e., $$H(f)\triangleq \mathcal{F}\{h(t)\}=\int_{\infty}^{\infty}h(t)e^{-j2\pi ft}dt, \tag{6a}$$

$$R_N(f,f')\mathcal{F}\triangleq^2\{r_N(t,s)\}-\int_{-\infty}^{\infty}\int_{-\infty}^{\infty}r_N(t,s)e^{-j2\pi(ft-f's)}dtds, \text{ and} \tag{6b}$$

$$\tilde{R}_N(f,f')\mathcal{F}\triangleq^2\{\tilde{r}_N(t,s)\}-\int_{-\infty}^{\infty}\int_{-\infty}^{\infty}\tilde{r}_N(t,s)e^{-j2\pi(ft-f's)}dtds, \tag{6c}$$

where the operators $F\{\cdot\}$ and $F^2\{\cdot\}$ denote the Fourier transform and the double Fourier transform, respectively. Then, this assumption can be written as $$H(f)=0,\forall f\notin[-B_0,B_0), \text{ and} \tag{7a}$$

$$R_N(f,f')=\tilde{R}_N(f,f')=0,\forall(f,f')\notin[-B_0,B_0)\times[-B_0,B_0), \tag{7b}$$

where the set operator x denotes the Cartesian product. In what follows, we alternately call $R_N(f,f')$ and $\tilde{R}_N(f, f')$ the two-dimensional (2-D) PSD and the 2-D complementary PSD of N(t), respectively.

It is well known that the 2-D PSD $R_N(f, f')$ of a cyclostationary random process N(t) with cycle period $T_0$ consists of impulse fences on the lines $f=f'-m/T_0$, for m∈Z where Z denotes the set of all integers. In other words, there exist functions $\{R_N^{(k)}(f)\}_{k\in\mathbb{Z}}$ such that $$R_N(f, f') = \sum_{k=\infty}^{\infty} R_N^{(k)}\left(f - \frac{k}{T_0}\right)\delta\left(f - f' - \frac{k}{T_0}\right), \tag{8a}$$

where δ(·) denotes the Dirac delta function. Similarly, the 2-D complementary PSD $\tilde{R}_N(f, f')$ can be rewritten as $$\tilde{R}_N(f, f') - \sum_{k=-\infty}^{\infty} \tilde{R}_N^{(k)}\left(f - \frac{k}{T_0}\right)\delta\left(f - f' - \frac{k}{T_0}\right). \tag{8b}$$

Note that the non-zero self-coherence (5b) and conjugate self-coherence (5c) in the form of the time-domain periodicity in t and s correspond to the non-zero impulse fences that are spaced the integer multiples of the cycle frequency $1/T_0$ apart in the frequency domain. These results can be obtained by double-Fourier transforming the Fourier series representations of $\tilde{r}_N(t, s)$, where the functions $\{R_N^{(k)}(f)\}_{k\in Z}$ and $\{\tilde{R}_N^{(k)}(f)\}_{k\in Z}$ represent the heights of the impulse fences. For a measure-theoretic treatment of these 2-D PSDs.

To avoid considering pathological functions, it is simply assumed in this paper that all frequency-domain functions such as $H(f)$, $\{R_N^{(k)}(f)\}_{k\in Z}$, and $\{\tilde{R}_N^{(k)}(f)\}_{k\in Z}$ are piecewise smooth.

Given the channel model described above, the objective of this paper is to find the capacity and the capacity-achieving distribution of the complex-valued channel input X(t), subject to the average input power constraint $$\lim_{\Delta\to\infty}\frac{1}{2\Delta}\int_{-\Delta}^{\Delta}\mathbb{E}\{|X(t)|^2\}\,dt - P. \tag{9}$$

Derivation of Equivalent MIMO Channel Using p-FRESH Vectorizer

In the present, we introduce two LCL-TV operators that convert back and forth between a scalar-valued signal and a vector-valued one. These operators are then used to find an equivalent MIMO channel model, which facilitates the derivation of the channel capacity This approach is strongly motivated by the past work on co-channel interference excision that converts a SISO channel into a MIMO channel in order to better exploit the spectral correlation in a cyclostationary interference. Before proceeding, we define Nyquist zones and half-Nyquist zones.

Definition 4: Given a pair (B, 1/T) of a reference bandwidth and a reference rate, the lth Nyquist zone $F_l$ its center frequency $f_l$ the half-Nyquist zone $F^+$ and the lth half-Nyquist zone $F_l^+$ are defined, respectively, as $$\mathcal{F}_l \triangleq \left\{f : f_l - \frac{1}{2T} \le f < f_l + \frac{1}{2T}\right\}, \tag{10a}$$

$$f_l \triangleq \frac{l - \lfloor L/2\rfloor - 1}{T}, \tag{10b}$$

$$\mathcal{F}^+ \triangleq \left\{f : 0 \le f < \frac{1}{2T}\right\}, \tag{10c}$$

and $$\mathcal{F}_l^+ \triangleq \mathcal{F}^+ + f_l = \left\{f : f_l \le f < f_l + \frac{1}{2T}\right\}, \tag{10d}$$

for l=1, 2, . . . , L, where the integer L is given by $$L \triangleq \lceil 2BT \rceil. \tag{10e}$$

Note that a half-Nyquist zone is just the right-half of the corresponding Nyquist zone. Also note that L is chosen as the number of length-1/(2T) intervals that can fully cover the one-sided frequency band $f\in[0,B)$ of interest.

First, we define an LCL-TV operator that converts a scalar-valued signal to a vector-valued one.

Definition 5: Given a reference pair (B, 1/T) and an input Y (t), the properizing FREquency SHift (p-FRESH)[2] vectorizer is defined as a single-input multiple-output (SIMO) LCL-TV system, whose output is given by $$Y(t) \triangleq \begin{bmatrix} Y_1(t) \\ Y_2(t) \\ \vdots \\ Y_{2L}(t) \end{bmatrix}, \tag{11a}$$

where the lth entry $Y_l(t)$, for l=1, 2, . . . , 2L, is given by $$Y_l(t) \triangleq \begin{cases} (Y(t)e^{-j2\pi f_l t}) * g(t), & \text{for } l \le L, \\ (Y(t) * e^{-j2\pi f_{l-L} t}) * g(t), & \text{for } l > L, \end{cases} \tag{11b}$$

with g(t) being the impulse response of the ideal brickwall filter having the half-Nyquist zone $F^+$ as the support, i.e., the Fourier transform $G(f) \triangleq \triangleq \{g(t)\}$ is given by $$G(f) = \begin{cases} 1, & \forall f \in \mathcal{F}^+ \\ 0, & \text{elsewhere.} \end{cases} \tag{12}$$

Figure 2A:
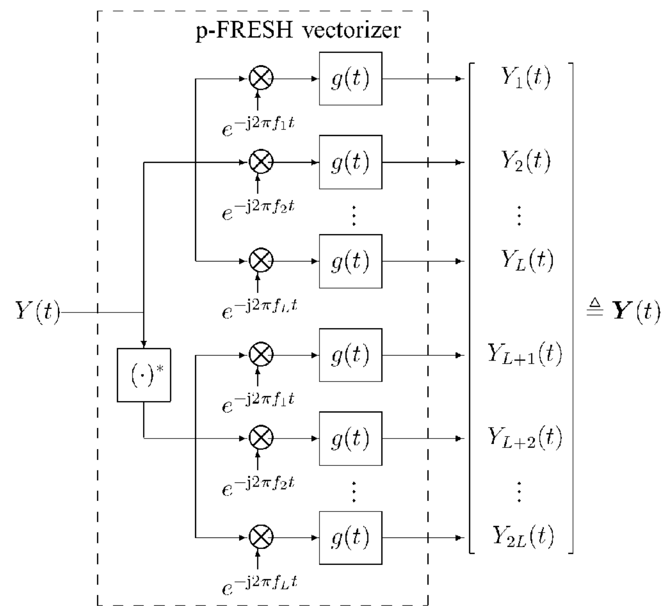
FIG. 2 (*a*) shows p-FRESH vectorization viewed in the time domain, FIG. 2 (*b*) shows p-FRESH vectorization viewed in the frequency domain for a deterministic signal s(t) with L=2.
Figure 2B:
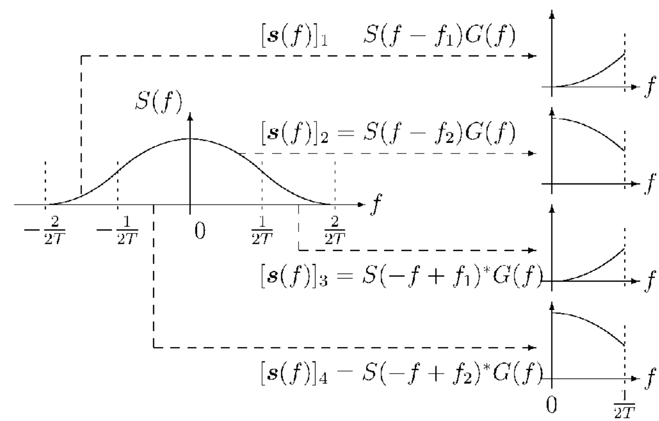

FIG. 2-(*a*) shows how a p-FRESH vectorizer works in the time domain, where a scalar-valued signal Y (t) is converted to a 2L-by-1 vector-valued signal.

The p-FRESH vectorizer modulates Y (t) and its complex conjugate Y(t)* each with L different carriers, of which frequencies are integer multiples of the reference rate 1/T, and filters to form Y (t), of which entries are all strictly bandlimited to the half-Nyquist zone $F^+$.

FIG. 2-(*b*) shows how a p-FRESH vectorizer works in the frequency domain when a deterministic signal s(t) with L=2 is converted to a vector-valued signal s(t). Let s(f) be the element-wise Fourier transform of s(t). Then, to generate the lth entry $[s(f)]_l$ of s(f), the p-FRESH vectorizer left-shifts the Fourier transform S(f) of s(t) by fl for l≤L, while S(−f)* by $f_{l-L}$ for l>L, and leaves only the signal component in $F^+$.

Note that, given a signal, different reference pairs result in different p-FRESH vectorizations in general. It can be seen that, given an arbitrary signal with bandwidth $B_0$, no information is lost during the vectorization as long as the reference bandwidth B satisfies $$B_0 \le B, \tag{13}$$

regardless of the reference rate 1/T. Note also that the p-FRESH vectorizer processes both Y (t) and Y(t)*, like linear-conjugate linear or, equivalently, widely linear filters that are devised to process improper-complex random signals. The major difference is that, as it can be easily seen from FIG. 2-(*b*), the p-FRESH vectorizer filters out half the signal components in Y (t) and Y(t)* to completely remove the redundancy during the vectorization.

Second, we define an LCL-TV operator that converts a vector-valued signal to a scalar-valued one.

Definition 6: The p-FRESH scalarization of a 2L-by-1 vector-valued signal X(t) with reference pair (B, 1/T) is defined as $$X(t) \triangleq \sum_{l=1}^{L}\{X_l(t)e^{j2\pi f_l t} + (X_{L+l}(t)e^{j2\pi f_l t})^*\}. \tag{14}$$

Figure 3:
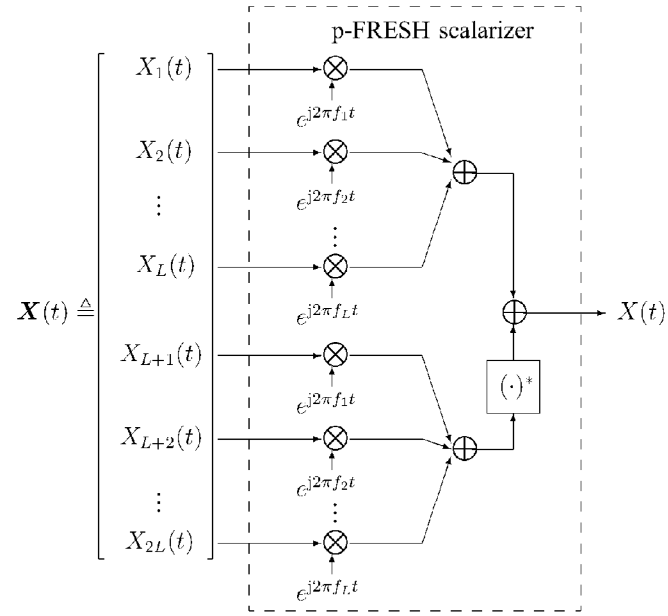
FIG. 3 shows p-FRESH scalarization viewed in the time domain.

FIG. 3 shows how a p-FRESH scalarizer works in the time domain, where a 2L-by-1 vectorvalued random process X(t) is converted to a scalar-valued random process X(t). In the frequency domain, the p-FRESH scalarizer right-shifts the lth input element $X_l(t)$ of X(t) by $f_l$, while the complex conjugate of the (L+1)th element by $-f_l$, both for l=1, 2, . . . , L, to construct the output X(t).

If the input to the p-FRESH scalarizer is the p-FRESH vectorized version of an SOCS random process with a reference bandwidth $B \geq B_0$ and an arbitrary reference rate 1/T, then the p-FRESH scalarizer with the same reference pair as the vectorizer just performs the inverse operation of the p-FRESH vectorization. In this sense, a p-FRESH vectorization of the SOCS process may not be more than one of many possible representations that convert a scalar-valued signal or random process to an equivalent vector-valued one. However, the following lemma shows that an appropriate choice of the reference rate 1/T is crucial to capture the correlation structure in an SOCS process. In what follows, we define superscripts T as H the transposition and the Hermitian transposition, respectively, and $0_{2L}$ and $0_{2L \times 2L}$ as the 2L-by-1 all-zero vector and the 2L-by-2L all-zero matrix, respectively.

Lemma 1: If the reference rate 1/T of a p-FRESH vectorizer is chosen such that a zero-mean SOCS random process input Y (t) with cycle period $T_0$ is also SOCS with cycle period T, then the output Y (t) always becomes a proper-complex zero-mean vector-WSS process, i.e., if $$T=KT_0 \tag{15}$$

for some positive integer K, then $$\mu_Y(t) \triangleq E\{Y(t)\}=0_{2L}, \forall t, \tag{16a}$$

$$r_Y(t,s) \triangleq E\{Y(t)Y(s)^{\mathcal{H}}\}=r_Y(t-s), \forall t, \forall s, \text{ and} \tag{16b}$$

$$\tilde{r}_Y(t,s) \triangleq E\{Y(t)Y(s)^{\mathcal{T}}\}=0_{2L \times 2L}, \forall t, \forall s, \tag{16c}$$

where $r_Y(\tau) \triangleq r_Y(\tau, 0)$ is a 2L-by-2L matrix-valued function.

Proof: See Appendix A.

As far as the auto-correlation function $r_Y(t,s)$ is concerned, this lemma applying the p-FRESH vectorizer to an SOCS input with an arbitrary K is a mere extension of the result, where the HSR is applied to a WSCS input with K=1. However, it additionally shows that, regardless of the propriety of the SOCS input, the complementary auto-correlation function $\tilde{r}_Y(t, s)$ always vanishes, which is not the case with the HSR unless the input is proper-complex.

Let $R_Y(f) \triangleq \mathcal{F}\{r_Y(\tau)\}$ be the 2L-by-2L element-wise Fourier transform of the auto-correlation matrix, i.e., is the PSD matrix of the p-FRESH vectorizer output Y (t). From Lemma 1, it can be seen that a p-FRESH vectorizer with $T=KT_0$ not only generates a sufficient statistic that allows a perfect reconstruction of the SOCS input Y (t) but also tactically aligns its frequency components in such a way that the vector-valued output Y (t) has no correlation among different frequency components and no complementary correlation at all on f∈F+. The next lemma points out one important property of the PSD matrix $R_Y(f)$ of Y (t).

Lemma 2: Given a reference pair (B, 1/T), the PSD matrix of the p-FRESH vectorizer output of an SOCS random process Y (t) with cycle period T is a Hermitian-symmetric positive semi-definite matrix for all f∈F+.

Proof: See Appendix B.

This property is used in the frequency-domain re-formulation of the problem. The following proposition shows how the p-FRESH vectorization of the channel output can be rewritten in terms of the p-FRESH vectorization of the channel input and that of the channel impulse response.

Proposition 1: The p-FRESH vectorization Y (t) of the channel output Y (t) can be rewritten as $$Y(t)=\mathrm{diag}\{h(t)\}*X(t)+N(t), \tag{17}$$

where Y(t), h(t), X(t), and N(t) are the p-FRESH vectorizations of Y (t), h(t), X(t), and N(t), respectively, and diag denotes the diagonal matrix having the lth diagonal entry equal to the lth entry of h(t).

Proof: By the definition (11b), the lth entry $[Y(t)]_l=Y_l(t)$ of Y(t) can be rewritten, for l≤L, as $$Y_l(t) \triangleq (Y(t)e^{-j2\pi f_l t}) * g(t) \tag{18a}$$

$$=((h(t)*X(t)+N(t))e^{-j2\pi f_l t}) * g(t) \tag{18b}$$

$$=\left(\int_{-\infty}^{\infty} h(\tau)X(t-\tau)\,d\tau \cdot e^{-j2\pi f_l t}\right) * g(t) + N_l(t) \tag{18c}$$

$$=\int_{-\infty}^{\infty} h(\tau)e^{-j2\pi f_l \tau} X_l(t-\tau)\,d\tau + N_l(t) \tag{18d}$$

$$=[h(t)]_l * [X(t)]_l + [N(t)]_l, \tag{18e}$$

where (18d) follows since the convolution with g(t) acts only on signals parameterized by t, and (18e) follows since g(t) is the impulse response of the ideal brickwall filter. Similarly, it can be shown that (18e) also holds for l>L. Therefore, we have (17).

Figure 4:
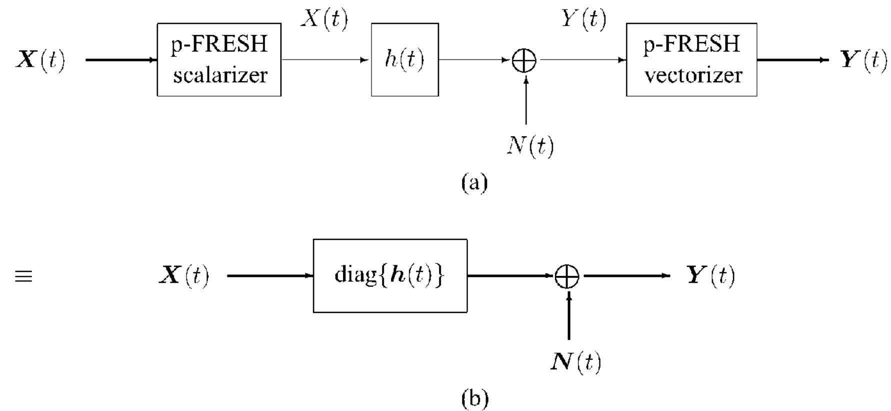
FIG. 4 (*a*) shows Conversion of a SISO channel to an equivalent MIMO channel by using a p-FRESH scalarizer and a p-FRESH vectorizer, FIG. 4 (*b*) shows Equivalent MIMO channel with vector-valued colored noise.

This implies that, by placing a p-FRESH scalarizer and a p-FRESH vectorizer, respectively, at the input and the output of the SISO channel as shown in FIG. 4-(*a*), the SISO channel depicted in FIG. 1 can be converted to an equivalent MIMO channel shown in FIG. 4-(*b*). This equivalent MIMO channel is simpler than general MIMO channels, in that the channel matrix is always square and diagonal. However, the additive proper-complex Gaussian noise N(t) is in general colored. Since the capacity of MIMO additive proper-complex white Gaussian noise channels is well known, we consider whitening the vector-WSS noise N(t) of the equivalent MIMO channel as shown in the next section.

Cyclic Water Filling and Capacity of SOCS Gaussian Noise Channel

In this section, the problem is re-formulated in the frequency domain and then the channel capacity is derived. Throughout the section, it is assumed that $$B=B_0 \text{ and } T=KT_0 \tag{19}$$

for some positive integer K, unless otherwise specified. Thus, the p-FRESH vectorization of Y(t) becomes a sufficient statistic and the SOCS noise becomes a vector-WSS process.

A. Noise Whitening and Problem Re-Formulation

To find a whitening filter, we need the following notions of effective Fourier transform of the p-FRESH vectorizer output, effective PSD matrix, degree of freedom, and effective element-wise inverse Fourier transform.

Definition 7: Suppose that a reference pair (B, 1/T) is given for a p-FRESH vectorizer and that $L \triangleq \lceil 2BT \rceil$ is defined as before.

(a) The effective Fourier transform of the p-FRESH vectorizer output of a deterministic signal s(t) is defined as a variable-length vector-valued function of f that is obtained by removing the Lth and the 2Lth entries of $s(f) \triangleq \mathcal{F}\{s(t)\}$ for $$B-\frac{L-1}{2T} \leq f < \frac{1}{2T} \tag{20a}$$

when L is odd, and the 1st and the (L+1)th entries for $$0 \le f < \frac{L}{2T} - B \tag{20b}$$

when L is even.

(b) The effective PSD matrix of the p-FRESH vectorizer output of an SOCS random process X(t) with cycle period T is defined as a variable-size matrix-valued function of f that is obtained by removing the Lth and the 2Lth rows and columns of $R_X(f) \triangleq \mathcal{F}\{r_X(\tau)\}$ for f satisfying the condition (20a) when L is odd, while the 1st and the (L+1)th rows and columns for f satisfying the condition (20b) when L is even.

(c) The degree of freedom $N_p(f)$ at f is defined as the length of an effective Fourier transform of the p-FRESH vectorizer output.

When we design a band-limited signal s(t) or a band-limited SOCS random process X(t), such a removal of the entries in s(f) or $R_X(f)$ is necessary because every entry is not always a free variable unless L=2BT. From (20a) and (20b), it can be seen that $N_p(f)$ is given by $$\mathcal{N}_p(f) \triangleq \begin{cases} 2L, & \text{for } f \in [0, B-(L-1)/(2T)), \\ 2L-2, & \text{otherwise} \end{cases} \tag{21a}$$

when L is odd, while $$\mathcal{N}_p(f) \triangleq \begin{cases} 2L-2, & \text{for } f \in [0, L/(2T)-B), \\ 2L, & \text{otherwise} \end{cases} \tag{21b}$$

when L is even. Thus, an effective Fourier transform of the p-FRESH vectorizer output becomes an Np(f)-by-1 vector and an effective PSD matrix becomes an Np(f)-by-Np(f) matrix at each f∈F+. For simplicity, we do not introduce new notations for the effective Fourier transforms and PSD matrices.

Definition 8: Given a reference pair (B, 1/T), the element-wise inverse Fourier transform of an Np(f)-by-Np(f) matrix-valued function of f∈F+ is defined as a 2L-by-2L matrix-valued function of t obtained as follows:

First, construct a 2L-by-2L matrix-valued function W(f) of f as if the Np(f)-by-Np(f) matrix-valued function is the effective PSD matrix of W(f).

Second, construct a 2L-by-2L matrix-valued function W(t) of t by applying the inverse Fourier transform to every entry of W(f).

Note that, by definition, the Lth and the 2Lth row and column of W(f) have all zero entries for f satisfying the condition (20a), while the 1st and the (L+1)th row and column have all zero entries for f satisfying the condition (20b).

Proposition 2: Let W(t) be the element-wise inverse Fourier transform of the inverse square root of the effective PSD matrix of N(t), i.e., $$W(t) = \mathcal{F}^{-1}\{R_N(f)^{-1/2}\}. \tag{22}$$

Then, the 2L-by-2L MIMO LTI system with impulse response W(t) whitens the noise N(t).

Proof: Define the output of the MIMO LTI system as $$\tilde{N}(t) \triangleq W(t)*N(t). \tag{23}$$

Then, its auto-correlation matrix $r_{\tilde{N}}(\tau)$ can be written as $$r_{\tilde{N}}(\tau) \triangleq \mathbb{E}\{\tilde{N}(t)\tilde{N}(t-\tau)^{\mathcal{H}}\} \tag{24a}$$

$$= \int_{-\infty}^{\infty}\int_{-\infty}^{\infty} W(t) r_N(\tau - t + s) W(s)^{\mathcal{H}}\, dt\, ds. \tag{24b}$$

Thus, the PSD matrix $R_{\tilde{N}}(f)$ is given by $$R_{\tilde{N}}(f) \triangleq \mathcal{F}\{r_{\tilde{N}}(\tau)\} \tag{25a}$$

$$= R_N(f)^{\frac{1}{2}} R_N(f) R_N(f)^{\frac{1}{2}} = I_{N_p(f)}, \tag{25b}$$

where we used the fact that $$R_N(f)^{-\frac{1}{2}}$$

exists for all f∈F+ because the PSD matrix $R_{N_I}(f)$ of the interference $N_I(t)$ is positive semi-definite ∀f∈F+ by Lemma 2 and the PSD matrix RNA(f) of the ambient noise NA(t) is a scaled identity matrix ∀f∈F+. Therefore, the conclusion follows.

This MIMO whitening filter plays a crucial role in formulating and solving the optimization problem to find the channel capacity in the frequency domain. In what follows, all the functions of f∈F+ are effective ones, unless otherwise specified.

Theorem 1: The optimization problem to find the capacity of an SOCS Gaussian noise channel is given by $$\underset{(R_X(f))_f}{\text{maximize}} \int_{\mathcal{F}^+} \log_2 \det\{I_{N_p(f)} + \tilde{H}(f) R_X(f) \tilde{H}(f)^{\mathcal{H}}\}\, df \tag{26a}$$

$$\text{subject to } \int_{\mathcal{F}^+} tr\{R_X(f)\}\, df = P, \tag{26b}$$

where tr{·} denote the trace, the PSD matrix $R_X(f)$ of X(t) is a positive semi-definite Np(f)-by-Np(f) matrix for all f∈F+, and the noise equivalent channel at f∈F+ is defined as $$\tilde{H}(f) \triangleq R_N(f)^{-\frac{1}{2}} H(f), \tag{27}$$

where $$H(f) \triangleq \text{diag}\{h(f)\}. \tag{28}$$

Proof: If we place the whitening filter W(t) defined by (22) at the output of the p-FRESH vectorizer in FIG. 4-(*a*), then the observation model (17) can be converted equivalently to $$\tilde{Y}(t) = \tilde{H}(t)*X(t) + \tilde{N}(t), \tag{29}$$

where $\tilde{N}(t)$ is defined in (23), and $\tilde{Y}(t)$ and $\tilde{H}(t)$ are defined as $\tilde{Y}(t) \triangleq W(t)*Y(t)$ and $\tilde{H}(t) \triangleq W(t)*\text{diag}\{h(t)\}$ respectively. Thus, the MIMO channel shown in FIG. 4-(*a*) is equivalent to that in FIG. 5-(*a*). Since the additive Gaussian noise $\tilde{N}(t)$ is white as shown in Proposition 2, the optimization problem to find the capacity of the SOCS Gaussian noise channel can be formulated in exactly the same way as that of a MIMO channel with a propercomplex white Gaussian noise, where the proper-complex Gaussianity of the channel input is necessary to achieve the capacity. Therefore, the conclusion follows.

Before we move to the next subsection where the solution to (26) is derived, we examine whether a different choice of K may result in a different value of the channel capacity or not.

Proposition 3: For any positive integer K, the problem described in (26) is equivalent to that with K=1.

Proof: Suppose that Y (t) is the output of the p-FRESH vectorizer when the input is Y (t) and T=KT$_0$ for some K>1. By pre-multiplying a permutation matrix, the elements of Y (t) can be rearranged as $$\overline{Y}(t) \triangleq \begin{bmatrix} Y^{(1)}(t) \\ Y^{(2)}(t) \\ \vdots \\ Y^{(K)}(t) \end{bmatrix}, \tag{30}$$

where the lth entry of $Y^{(k)}(t)$, for k=1, 2, . . . , K, is defined as $[Y^{(k)}(t)]_l$, $Y_{(l-1)K+k}(t)$.

If the permuted vector-valued noise N and its elements $N^{(k)}(t)$, for k=1, 2, . . . , K, are similarly defined, then, by Lemma 1 with K=1, we have independence among $N^{(k)}(t)$, for k=1, 2, . . . , K. It is well known that the capacity of parallel Gaussian channels with independent noise components can be achieved by using independent channel codes. Thus, the optimal input PSD matrix $R_X(f)$ becomes a block diagonal matrix. If we multiply complex exponential functions to $Y^{(k)}$, for k=1, 2, . . . , K, such that $Y^{(k)}$ is shifted in the frequency domain to the interval $f\in[(k-1)/(2KT_0),\ k/(2KT_0))$, the mutual information to be maximized becomes $$\sum_{k=1}^{K}\int_{\frac{k}{2K}\frac{1}{T_0}}^{\frac{k}{2KT_0}} \log_2\det\{I_{N_p(f)} + \tilde{H}(f)R_X(f)\tilde{H}(f)^{\mathcal{H}}\}df, \tag{31}$$

which is identical to (26a) with K=1, where $N_p(f)$, $\tilde{H}(f)$, and $R_X(f)$ are all defined for K=1. Since the optimization problems have the same objective functions and constraints, the conclusion follows.

B. Optimal Solution and Its Property

The optimal solution to (26) is derived and its property is investigated. For this, consider the singular value decomposition $$\tilde{H}(f)U(f)\Gamma(f)V(f)^{\mathcal{H}} \tag{32}$$

of the Np(f)-by-Np(f) noise equivalent channel matrix $\tilde{H}(f)$ for each f∈F+, where U(f) and V (f) are unitary matrices, and T(f) is a diagonal matrix having the singular values $\gamma_n(f)$, for n=1, 2, . . . , Np(f), as the diagonal entries.

Theorem 2: Let $R_{\hat{X},opt}(f)$ be an Np(f)-by-Np(f) diagonal matrix whose nth diagonal entry is given by $$[R_{\hat{X},opt}(f)]_{n,n} \triangleq \left[v_{opt} - \frac{1}{\gamma_n(f)^2}\right]^+, \tag{33a}$$

where $v_{opt}$ is the unique solution to $$\int_{\mathcal{F}^+}\sum_{n=1}^{N_p(f)}\left[v_{opt} - \frac{1}{\gamma_n(f)^2}\right]^+ df = P \tag{33b}$$

with $[\chi]^+ \triangleq (\chi+|\chi|)/2$ denoting the positive part of x.[3] Then, the optimal solution to (26) is given by $$R_{X,opt}(f)-V(f)R_{\hat{X},opt}(f)V(f)^{\mathcal{H}}, \tag{34}$$

and, consequently, the capacity of the SOCS Gaussian noise channel is given by $$C_{SOCS} = \int_{\mathcal{F}^-}\sum_{n=1}^{N_p(f)}\log_2(1+[\gamma_n(f)^2v_{opt}-1]^+)df. \tag{35}$$

Proof: By linearly pre-coding the signal x(t) as $\hat{X}(t) \triangleq \mathcal{F}^{-1}\{V(f)^{\mathcal{H}}\}*X(t)$ and transforming the whitened observation $\tilde{Y}(t)$ as $\hat{Y}(t) \triangleq \mathcal{F}^{-1}\{U(f)^{\mathcal{H}}\}*\tilde{Y}(t)$, we obtain $\hat{Y}(t)=\mathcal{F}^{-1}\{\Gamma(f)\}*X(t)+\hat{N}(t)$, where $\hat{N}(t) \triangleq \mathcal{F}^{-1}\{U(f)^{\mathcal{H}}\}*\tilde{N}(t)$. Thus, the MIMO channel shown in FIG. 5-(*a*) is equivalent to that in FIG. 5-(*b*). Because the proper-complex noise process $\tilde{N}(t)$ is white and U(f) is unitary, the noise process $\hat{N}(t)$ is also proper-complex and white.

Thus, the integrand of the objective function in (26a) can be rewritten as log 2 $\det\{I_{N_p}(f)+\Gamma(f)R_{\hat{X}}(f)\Gamma(f)^{\mathcal{H}}\}$, where $$R_{\hat{X}}(f) \triangleq V(f)^{\mathcal{H}}R_X(f)V(f), \tag{36}$$

and the constraint (26b) can be rewritten as $\int_{\mathcal{F}}$ tr$\{R_{\hat{X}}(f)\}df-P$ with a positive semi-definite matrix-valued function $R_{\hat{X}}(f)$ as the decision parameter. This implies that we now have a MIMO proper-complex Gaussian noise channel with input $\hat{X}(t)$, channel $\mathcal{F}^{-1}\{\Gamma(f)\}$, output $\hat{Y}(t)$, and average power constraint P. Therefore, from the water filling for parallel Gaussian channels, we have (33) and (35). Also by (36), we have (34).

We call this water filling procedure described in Theorem 2 the cyclic water filling (CWF) because the resultant optimal input signal to the SISO channel is SOCS in general, which is proved in the following theorem.

Theorem 3: The optimal input to the SOCS Gaussian noise channel is an SOCS Gaussian random process with the same cycle period as the noise.

Proof: Let $X_{l,opt}(t)$ be the lth entry of the optimal input $X_{opt}(t)$ to the equivalent MIMO channel. Then, as (14), the optimal input $X_{opt}(t)$ to the SISO channel can be written as $$X_{opt}(t) = \sum_{l=1}^{L}\{X_{l,opt}(t)e^{j2\pi f_l t} + (X_{L+l,opt}(t)e^{j2\pi f_l t})^*\}. \tag{37}$$

Now, the auto-correlation function $r_{X,opt}(t, s) \triangleq \mathbb{E}\{X_{opt}(t)X_{opt}(s)^*\}$ of $X_{opt}(t)$ can be written as $$r_{X,opt}(t,s) - \sum_{l=1}^{L}\sum_{l'=1}^{L}\{[r_{X,opt}(t-s)]_{l,l'}e^{j2\pi(f_l t - f_{l'} s)} + ([r_{X,opt}(t-s)]_{L+l,L+l'})^* e^{-j2\pi(f_l t - f_{l'} s)}\} \tag{38a}$$

$$= r_{X,opt}(t+T, s+T),\ \forall t,\ \forall s, \tag{38b}$$

where we used the fact that, by (10b), $f_l T$ and $f_{l'} T$ are always integers for all l and l', and that the optimal input $X_{opt}(t)$ has a vanishing complementary auto-correlation function. Similarly, the complementary auto-correlation function $\tilde{r}_{X,opt}(t, s)\, \mathbb{E} \triangleq \{X_{opt}(t)X_{opt}(s)\}$ of $X_{opt}(t)$ can be written as $$\tilde{r}_{X,opt}(t,s) - \sum_{l=1}^{L}\sum_{l'-1}^{L}\left\{[r_{X,opt}(t-s)]_{l,L+l'}e^{j2\pi(f_l t - f_{l'} s)} + \left([r_{X,opt}(t-s)]_{L+l,l'}\right)^* e^{j2\pi(f_l t\ f_{l'} s)}\right\} \tag{39a}$$

$$-\tilde{r}_{X,opt}(t+T, s+T),\ \forall\, t,\ \forall\, s. \tag{39b}$$

Thus, $X_{opt}(t)$ is SOCS with cycle period T. In addition, $X_{opt}(t)$ is Gaussian as shown in Theorem 2.

Moreover, by Proposition 3, any optimal solution to (26) with K>1 is also an optimal solution to the problem with K=1, which means the cycle period of an optimal solution $X_{opt}(t)$ is $T_0$. Therefore, the conclusion follows.

Note that this theorem does not claim that the optimal input signal $X_{opt}(t)$ cannot be secondorder stationary. It can be second-order stationary, because a second-order stationary process is also an SOCS process for any cycle period T>0. Note also that the optimal input is in general improper-complex. However, it can be seen easily, the optimal input is always proper-complex if the SOCS complex Gaussian noise is proper.

In the present invention, we provide discussions and numerical results. First, we outline the proof that the worst-case interference is Gaussian given the second-order properties of the SOCS interference.

Figure 5:
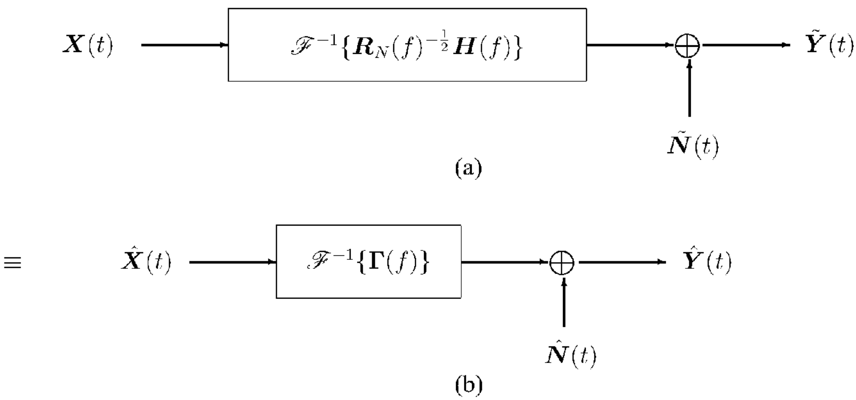
FIG. 5 (*a*) shows Conversion of the MIMO channel to an equivalent MIMO channel with vector-valued white noise, FIG. 5 (*b*) shows Equivalent parallel MIMO channel with vector-valued white noise.

By taking the Nyquist-rate samples from the output of the equivalent MIMO channel in FIG. 5 with a vector-valued white noise, the problem can be converted to a mutual information game over a discrete-time memoryless channel. If $B_0$ is an integer multiple of $1/(2T_0)$, then the result is directly applicable to the sampled output of the equivalent channel in FIG. 5-(*a*) to show the Gaussinity of the worst-case interference. Otherwise, the result combined with the independence bound and the water-filling argument can be applied to each output branch of the equivalent channel in FIG. 5-(*b*).

Second, we discuss how to handle the cases with an improper-complex SOCS noise having a non-zero frequency offset and those with unequal frequency bands for signal transmission and reception. Unlike a proper-complex SOCS noise, an improper-complex SOCS noise exhibits non-zero spectral correlation not only between the components that are integer multiples of the symbol rate 1/T apart but also between two components that are equally distant from the center frequency. So far, it is assumed that this center frequency of symmetry is the same as the center frequency of the communication channel. Suppose that there is a non-zero offset between these two center frequencies. Then, to make the output of the p-FRESH vectorizer a proper-complex vector-WSS random process, we need to choose the center frequency of symmetry as the origin in complex baseband. If we choose B to include the entire communication channel as before, then the interval f∈[−B,B) may include a frequency band that is not a part of the communication channel. So, we need to set the channel response H(f) and the interference component in the 2-D PSDs $R_{\mathcal{N}}(f, f')$ and $\tilde{R}_{\mathcal{N}}(f, f')$ to zero outside the communication channel, before performing the CWF. Now, suppose that the frequency bands for signal transmission and reception are overlapping but not identical. Then, we need to re-define the frequency band for transmission as described and set the channel response H(f) to zero outside this transmit band, before performing the CWF or possibly the modified CWF discussed above.

Next, we provide numerical results that demonstrate the effectiveness of the CWF in exploiting the cyclostationarity of the noise. For simplicity, it is assumed that the interference NI(t) is modeled as (4), where the data sequences $(c_1[n])_n$ and $(c_2[n])_n$ are independent, each data sequence consists of independent and identically distributed zero-mean real Gaussian random variables with variance $\sigma_i^2$ for i=1, 2, and the transmit pulses satisfy the relation $p_1(t)=p(t)$ and $p_2(t)=p(t-\Delta)$. In what follows, the variance $\sigma_i^2$ and the offset Δ are chosen as $\sigma_2^2=0$ for DSB, SSB, and VSB PAMs, $\sigma_1^2=\sigma_2^2$ and Δ=0 for QAM, and $\sigma_1^2=\sigma_2^2$ but $\Delta=T_0/2$ for SQPSK. Let p(f) and $\hat{p}(f)$ be the responses of the p-FRESH vectorizer to the inputs p(t) and jp(t−Δ). Then, it can be shown that the PSD matrix $R_{N_I}(f)$ of $N_I(t)$ is given by $$R_{N_I}(f) = \frac{\sigma_1^2}{T_0} p(f)p(f)^{\mathcal{H}} + \frac{\sigma_2^2}{T_0}\hat{p}(f)\hat{p}(f)^{\mathcal{H}}, \tag{40}$$

under this assumption. Note that Δ=0 does not imply $\hat{p}(f)=jp(f)$ in general, because the p-FRESH vectorizer is not a linear but a linear-conjugate linear operator. It can be also shown that $N_I(t)$ is proper-complex if and only if $R_{N_I}(f)$ is a block diagonal matrix in which each block is (Np(f)/2)-by-(Np(f)/2) for all f∈F+.

A root raised-cosine (RRC) pulse with roll-off factor β∈[0, 1] is used as p(t) except the SSB and the VSB modulations, where its filtered version is used instead. In addition to the bandwidth assumption (7a), H(f) is assumed to be unity on the frequency band [−B0,B0), where the bandwidth $B_0$ and the roll-off factor are related to the cycle period $T_0$ as $$B_0 T_0 = \frac{1+\beta}{2}, \tag{41}$$

i.e., $N_I(t)$ as well as $N_A(t)$ fully occupies the entire frequency band of interest. Under this flat channel assumption, it turns out that a result obtained by using the RRC pulse with roll-off factor β is the same as that obtained by using any square root Nyquist pulse with excess bandwidth B. This is because, though the PSD matrix $R_{N_I}(f)$ in (40) changes, its eigenvalue distribution does not change. For convenience, the passband bandwidth $W \triangleq 2B_0$ is used.

The first results are to compare the performance of the CWF with that of the ordinary water filling (OWF), which ignores the spectral correlation in the cyclostationary noise N(t). The interference is generated by using QAM, thus proper-complex, and leads to the power $P_I$. Then, it can be shown that the capacity of this SOCS proper-complex Gaussian noise channel is given by $$C - \frac{W\beta}{1+\beta}\log_2\left(1 + \frac{\min(P, \beta P_I) + \frac{[P-\beta P_I]+\beta}{1+\beta}}{N_0\frac{W\beta}{1+\beta}}\right) + \tag{42}$$

Figure 6:
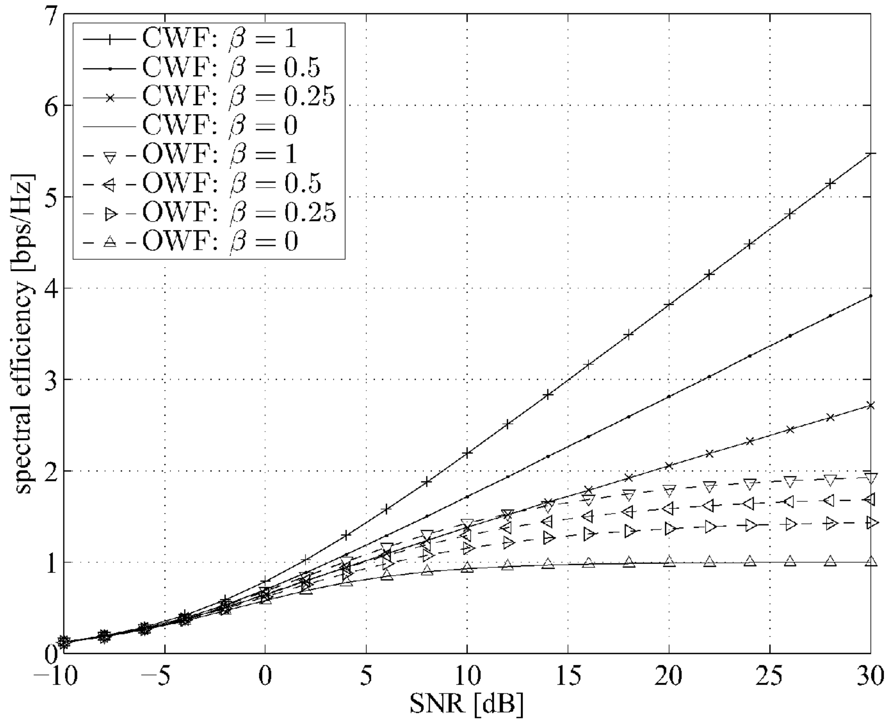
FIG. 6 shows Comparison of the CWF and the OWF with SIR $P/P_I$=0 dB when a proper-complex Gaussian interference is generated by using QAM or an improper-complex Gaussian interference is generated by using SQPSK.

-continued $$\frac{W}{1+\beta}\log_2\left(1+\frac{\frac{[P-\beta P_I]^+}{1+\beta}}{N_0\frac{W}{1+\beta}+P_I}\right)\ [\text{bps}],$$

for $0 \le \beta \le 1$. This is because, though $N_I(t)$ physically occupies the entire frequency band, it occupies in effect only a fraction $1/(WT_0)=1/(1+\beta)$ of the frequency band and leaves/(1+) unoccupied, as evidenced by the pre-log coefficients in (42). FIG. 6 shows the spectral efficiency C/W as functions of the signal-to-noise ratio (SNR) $P/(N_0W)$ for various rolloff factors. The signal-to-interference ratio (SIR) $P/P_I$ is fixed at 0 dB. Note that the CWF that exploits the spectral correlation in the cyclostationary interference significantly outperforms the OWF except the case with $\beta=0$, where $N_I(t)$ degenerates to a proper-complex white Gaussian noise without any spectral correlation. It can be also shown that the improper-complex interference generated by using SQPSK results in the same capacity as (42). This is because, though the PSD matrix changes, its eigenvalue distribution does not change.

The second results are to compare the performance of the CWF with that of the OWF, when the interference is generated by using DSB PAM, thus improper-complex. Since $N_I(t)$ exists only in the real part, the OWF separately processes the real and the imaginary parts. Then, it can be shown that the capacity of this SOCS improper-complex Gaussian noise channel is given by $$C=\frac{W(1+2\beta)}{2+2\beta}\log_2\left(1+\frac{\min(P,(1+2\beta)P_I)+\frac{P-(1+2\beta)P_I|^+(1+2\beta)}{2+2\beta}}{N_0\frac{W(1+2\beta)}{2+2\beta}}\right)+\frac{W}{2+2\beta}\log_2\left(1+\frac{\frac{|P-(1+2\beta)P_I|^+}{2+2\beta}}{N_0\frac{W}{2+2\beta}+P_I}\right)\ [\text{bps}],\tag{43}$$

for $0 \le \beta \le 1$. This is because $N_I(t)$ occupies in effect only a fraction $1/(2+2\beta)$ of the frequency band and leaves $(1+2\beta)/(2+2\beta)$ unoccupied, as evidenced by the pre-log coefficients in (43).

Figure 7:
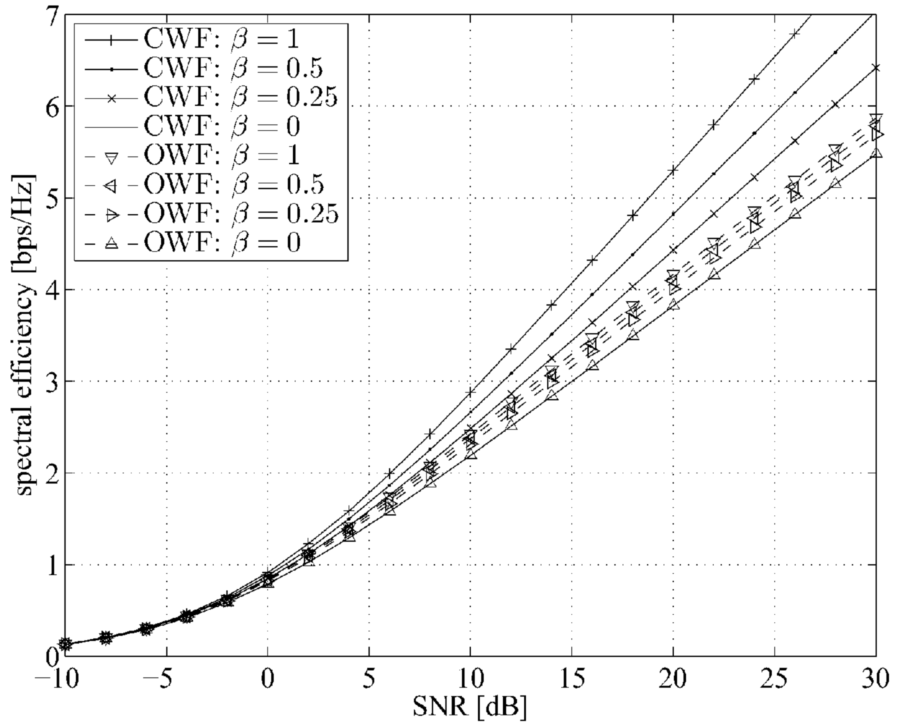
FIG. 7 shows Comparison of the CWF and the OWF with SIR $P/P_I$=0 dB when an improper-complex Gaussian interference is generated by using DSB or SSB PAM.

Similar to FIG. 6, FIG. 7 shows the spectral efficiency versus SNR with the SIR fixed at 0 dB. Note again that the CWF significantly outperforms the OWF except the case with $\beta=0$, where $N_I(t)$ degenerates to a real white Gaussian noise with only impropriety to be exploited. In this case, the capacity formula (43) reduces to that for a parallel Gaussian noise channel with two sub-channels having the same bandwidth W/2 but different noise power $N_0W/2$ and $N_0W/2+P_I$, respectively.

This result perfectly agrees with the intuition for independently processed real and imaginary parts. It can be also shown that the improper-complex interference generated by using SSB PAM results in the same capacity as (43) and, consequently, the same spectral efficiency as FIG. 7, when the channel includes the negative frequency band that is not occupied by $N_I(t)$.

This is because both the DSB and the SSB PAMs utilize only half the frequency band. It is also the case with the improper-complex interference generated by using VSB PAM. To the contrary, when the channel does not includes the negative frequency band, the improper-complex interference generated by using SSB PAM results in half the channel capacity of (42) and, consequently, the same spectral efficiency as FIG. 6.

Figure 8:
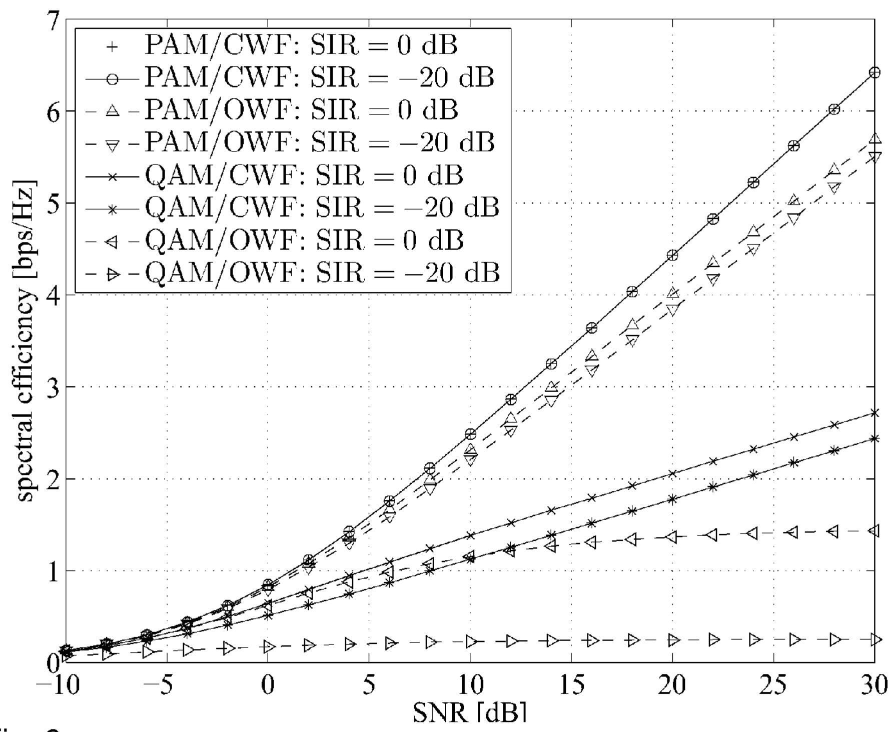
FIG. 8 shows Comparison of the CWF and the OWF when β=0.25 and SIR=0 and −20 dB.

The final results are to compare the performance of the CWF with that of the OWF, when a strong interference is present in the channel. FIG. 8 shows the spectral efficiency of the channels considered in FIGS. 6 and 7 versus SNR, now with $\beta=0.25$ and SIR=0 and −20 dB. When $N_I(t)$ is generated by DSB PAM, the CWF suffers no performance degradation. This is because the CWF at SIR=0 dB orthogonalizes the channel input to the interference, so that the enhanced interference level at any SIR<0 dB does not affect the performance at all. To the contrary, the OWF suffers performance degradation because, though most of the information transmission is through the imaginary part, it observes severe noise enhancement in the real part. When $N_I(t)$ is generated by QAM, the CWF suffers much mild performance degradation than the OWF. This is because, though severe noise enhancement is observed in all frequency components, the CWF can exploit the spectral correlation to suppress the interference.

In the present invention, we have derived the capacity of an SOCS complex Gaussian noise channel. By using the p-FRESH vectorization of the input, impulse response, and output of the channel, the SISO channel is converted into an equivalent MIMO channel and its capacity is derived in the frequency domain. A geometric procedure called the CWF is proposed to construct an optimal input distribution that achieves the capacity. It is shown that the CWF significantly outperforms the OWF that ignores the spectral correlation of the SOCS noise.

Although the CWF achieves the capacity, the knowledge on the center frequency of the SOCS noise is required when the complex noise is improper. Thus, extensions to the cases with an uncertainty in the center frequency or with a channel impairment in the form of phase jittering are interesting future research directions. Deriving the capacity and the capacity-achieving schemes for a channel with a non-Gaussian noise or with multiple spectrally overlapping improper-complex SOCS interferences having different center frequencies is another future work that warrants further investigation. Particularly, in the latter case, the use of the spectral correlation density function or its variant will be necessary to characterize the interferences in the cycle frequency and the spectral frequency domains. It is also an interesting future research to derive practical signal processing structures that provide the same properizing and stationarizing operation as the p-FRESH vectorizer.

APPENDIX

A. Proof of Lemma 1

Proof: It is straightforward to show (16a) by using $\mu Y(t)=0$, $\forall t$. To show (16b) and (16c), similar to (8a) and (8b), let $\{R_Y^{(k)}(f)\}_{k\in Z}$ and $\{\tilde{R}_Y^{(k)}(f)\}_{k\in\mathbb{Z}}$ be the functions such that $R_Y(f, f')=\Sigma_{k=-\infty}^{\propto}R_Y^{(k)}(f-k/T)\delta(f-f'-k/T)$ and $\tilde{R}_Y(f, f')=\Sigma_{k=-\infty}^{\infty}\tilde{R}_Y^{(k)}(fk/T)\delta(f-f'-k/T)$. Then, the cross-correlation between $Y_l(t)$ and $Y_{l'}(s)$ for $l,l'\le L$ is given by $$\mathbb{E}\{Y_l(t)Y_{l'}(s)^*\}=\int_{-B}^{B}\int_{-B}^{B}G(f-f_l)e^{j2\pi(f-f_l)^t}R_Y(f,f')G(f'-f_{l'})^*e^{-j2\pi(f'-f_{l'})s}\,df\,df'\tag{44a}$$

-continued $$= \int_{\mathcal{F}_l^+}\int_{\mathcal{F}_{l'}^+} R_Y(f,f')e^{j2\pi(ft-f's)}e^{-j2\pi(f_l t-f_{l'}s)}\,df\,df' \quad (44b)$$

$$= \int_{\mathcal{F}^+} R_Y^{(l-l')}(f+f_{l'})e^{j2\pi f(t-s)}\,df, \quad (44c)$$

where Parseval's relation is used twice in (44a) and the identity $f_l - f_{l'} = (l-l')/T$ is used in (44c). In the same way, we have $$\mathbb{E}\{Y_l(t)Y_{l'}(s)^*\} = \quad (45)$$

$$\begin{cases} \int_{\mathcal{F}^+} \tilde{R}_Y^{(l-l'+L)}(f+f_{l'-L})e^{j2\pi f(t-s)}\,df, & \text{for } l \le L < l', \\ \int_{\mathcal{F}^+} \tilde{R}_Y^{(l'\ \ l+L)}(-f-f_{l'})*e^{j2\pi f(t-s)}\,df, & \text{for } l' \le L < l, \\ \int_{\mathcal{F}^+} R_Y^{(l'-l)}(-f-f_{l'-L})*e^{j2\pi f(l-s)}\,df, & \text{for } l, l' > L. \end{cases}$$

Thus, the cross-correlation $E(Y_l(t)Y_{l'}(s)^*)$ becomes a function only of t−s, ∀l, ∀l'.

On the other hand, the complementary cross-correlation between $Y_l(t)$ and $Y_{l'}(s)$ for l,l'≤L is given by $$\mathbb{E}\{Y_l(t)Y_{l'}(s)\} = \int_B^B\int_B^B G(f-f_l)e^{j2\pi(f-f_l)t} \quad (46a)$$

$$\tilde{R}_Y(f,-f')G(f'-f_{l'})e^{j2\pi(f'-f_{l'})s}\,df\,df'$$

$$= \int_{\mathcal{F}_l^+}\int_{\mathcal{F}_{l'}^+} \tilde{R}_Y(f,-f')e^{j2\pi(f-f_l)t}e^{j2\pi(f'-f_{l'})s}\,df\,df' \quad (46b)$$

$$= 0. \quad (46c)$$

This is because the impulse fences of $R_Y(f,-f')$ on $f=-f'-m/T$ do not cross the integration area $(f, f')\in F_l^+\times F_{l'}^+$. In the same way, we have $E(Y_l(t)Y_{l'}(s))=0$ for other cases of l, l'.

Thus, the complementary cross-correlation $E(Y_l(t)Y_{l'}(s)^*)$ becomes zero, ∀l, ∀l'. Therefore, the conclusion follows.

B. Proof of Lemma 2

Proof: The Hermitian symmetry follows straightforwardly from the element-wise Fourier transform of $r_Y(\tau) - \mathbb{E}\{Y(t)Y(t-\tau)^{\mathcal{H}}\} - \mathbb{E}\{\boldsymbol{Y}(t-\tau)\boldsymbol{Y}(t)^{\mathcal{H}}\}^{\mathcal{H}} - r_Y(-\tau)^{\mathcal{H}}$. Now, consider filtering the p-FRESH vectorizer output Y (t) by using the LTI filter with impulse response $A(-t)^{\mathcal{H}} \triangleq \mathrm{diag}\{\alpha_1(-t)^*, \alpha_2(-t)^*, \ldots, \alpha_{2L}(-t)^*\}$. Then, the power of the LTI filter output sampled at t=0 is given by $$\mathbb{E}\{\|A(-t)^{\mathcal{H}} * Y(t)|_{t-0}\|^2\} - \sum_{l=1}^{2L}\sum_{l'=1}^{2L}\int_{-\infty}^{\infty}\int_{-\infty}^{\infty} a_l(\tau)^* \quad (47a)$$

$$a_l(\tau)^*[r_Y(\tau,\tau')]_{l,l'}a_{l'}(\tau')\,d\tau\,d\tau'$$

$$= \sum_{l=1}^{2L}\sum_{l'=1}^{2L}\int_{\mathcal{F}^+} A_l(f)^\times[R_Y(f)]_{l,l'}A_{l'}(f)\,df \quad (47b)$$

$$= \int_{\mathcal{F}^+} a(f)^{\mathcal{H}} R_Y(f)a(f)\,df \ge 0, \quad (47c)$$

where a(f) is the 2L-by-1 vector of the element-wise Fourier transform of $[a1(t), a2(t), \ldots, a2L(t)]^T$. Since $a_1(t)$ is arbitrary for all 1, (47c) implies a(f)HRY (f)a(f)≥0, ∀a(f), ∀f∈F+.

Therefore, the conclusion follows.

Furthermore, we will work with the 2KL-dimensional vector, which is obtained by sampling the 4L outputs of the p-FRESH vectorizer with Nyquist sampling rate 1/(2T) in [0,KT). Supposed that K is an even integer. The observation vector obtained by sampling the lth output of p-FRESH vectorizer is defined as $$\tilde{Y}_l \triangleq \left[\tilde{Y}_{l,1}\,\tilde{Y}_{l,2}\,\ldots\,\tilde{Y}_{l,\frac{K}{2}}\right]^T$$

where $$\tilde{Y}_{l,n} \triangleq \tilde{Y}_l(t)\big|_{t=2nT}.$$

At below, "" on a letter is same to "'". The signal component X' and noise component N' of the total observation vector of the p-FRESH vectorizer are given, respectively, by cascades of $X'_l$ and $N'_l$, which are the signal and the noise components in the lth output observation vector $Y'_l$, respectively. Then, the hypothesis testing problem can be rewritten as (48).

$$\mathcal{H}_0: \tilde{Y}=\tilde{N} \text{ vs. } \mathcal{H}_1: \tilde{Y}=\tilde{X}+\tilde{N} \quad (48)$$

We have two important remarks. First, the complementary auto-covariance matrix of Y' is the all zero matrix. Second, the cross-covariance matrices of Y'm and 'Yn are Toeplitz matrices, then the auto-covariance matrix of Y' is a block matrix with the Toeplitz matrices. By using the fact that the complementary auto-covariance matrix of Y' is a block matrix with the Toeplitz matrices. By using the fact that the complementary auto-covariance matrix of Y' vanishes, the loglikelihood ratio (LLR) for the detection problem (48) can be directly derived in the following proposition.

Proposition 1: The LLR of the problem (48) is derived as $$l(\tilde{Y}) = \sum_{k=1}^{2KL}\frac{\lambda_k}{\sigma^2(\sigma^2+\lambda_k)}\left|u_k^{\mathcal{H}}\tilde{Y}\right|^2 \quad (49)$$

where $\lambda_k$ and $u_k$ are the eigenvalues and the corresponding othornormal eigenvectors of the auto-covariance matrix $r_{Y'}$ of Y'.

Proof: By using the EVD and Gaussian approximation that can be justified by the central limit theorem and the fact that the detector operates in very low signalto-noise (SNR) environments where the ambient Gaussian noise dominates the SOCS random signal.

The LLR (48) is in the form of an estimator-correlator in the time domain. The calculation of this LLR, however, suffers from high computational complexity due to the EVD to obtain the eigenvalues and the eigenvectors. Motivated by fact that the double Fourier transform of the auto-covariance function of an SOCS random process consists of impulse fences, we invoke a block matrix approximation with diagonal blocks to the frequency-domain auto-covariance matrix.

Before proceeding, we define the N×N discrete-time Fourier transform (DFT) matrix $W_N$ as $$[W_N]_{k_1,k_2} \triangleq \frac{1}{\sqrt{N}}e^{-j2\pi\frac{(k_1-1)(k_2-1)}{N}}$$

for $k_1, k_2 = 1, \ldots, N$, where the operator $[(k_1, k_2$ denotes the $(k_1, k_2)$th entry of a matrix. Once the frequency-domain observation W̃Ỹ is given by $$\tilde{W}\tilde{Y} \triangleq \left[\left(W_{\frac{K}{2}}\tilde{Y}_1\right)^T \ldots \left(W_{\frac{K}{2}}\tilde{Y}_{4L}\right)^T\right]^T$$

where $\hat{W} \triangleq I_{4L} \otimes W_{K/2}$, the detection problem in the time domain is then converted to that in the frequency domain, which can be rewritten as $$\mathcal{H}_0: \tilde{W}\tilde{Y} = \tilde{W}\tilde{N} \text{ vs. } \mathcal{H}_1: \tilde{W}\tilde{Y} = \tilde{W}\tilde{X} + \tilde{W}\tilde{N} \quad (51)$$

Let $S_{Y'}$ be the auto-covariance matrix of W', Y'. A block matrix approximation with diagonal blocks is invoked to $S_{Y'}$ in the following lemma.

Lemma 2: Let (K/2)-by-(K/2) matrix $S_{Y'}^{(m,n)}$ be the (m,n)th block of the auto-covariance matrix $S_{Y'}$. Then, $S_{Y'}$ can be accurately approximated by a diagonal matrix for sufficiently large K.

Proof: The (K/2)-by-(K/2) matrix $S_{Y'}^{(m,n)}$ is given by $$S_{\tilde{Y}}^{(m,n)} = W_{\frac{K}{2}} r_{\tilde{Y}}^{(m,n)} W_{\frac{K}{2}}^{\mathcal{H}}$$

where $$r_{\tilde{Y}}^{(m,n)}$$

is the crosscovariance matrix of Y'm and Y'n. Note that $r_{Y'}^{(m,n)}$ is a Toeplitz matrix since its (k1,k2)th entry is given by the value $r_{Y'}(\tau)$ defined at $\tau=(k1-k2)/(2T)$. By applying the result, the conclusion follows.

Let $R_{\tilde{Y}}(f) \triangleq \mathcal{F}\{r_{\tilde{Y}}(\tau)\}$ be the 4L-by-4L element-wise Fourier transform of the auto-correlation matrix $r_{Y'}(\tau)$ and be named the PSD matrix of the p-FRESH vectorizer output Y (t).

In the following lemma, we provide the other approximation of $S_{Y'}$ by using $R_{Y'}(f)$.

Lemma 3: The diagonal entries of the diagonal matrix $S_{Y'}^{(m,n)}$ an be approximated by using the PSD matrix $R_{Y'}(f)$ as $$\left[S_{\tilde{Y}}^{(m,n)}\right]_{(k,k)} = \frac{1}{2T}\left[R_{\tilde{Y}}\left(\frac{k-1}{KT}\right)\right]_{(m,n)} \quad (52)$$

$$\text{for } k=1,2,\ldots,K/2. \quad (53)$$

Proof. The detailed proof is omitted here.

Similarly, the (m, n)th block $S_{\tilde{X}}^{(m,n)}$ of the auto-covariance matrix $S_{\tilde{X}}$ of $\tilde{W}\tilde{X}$ can be accurately approximated by a diagonal matrix whose diagonal entries are given by $$\left[S_{\tilde{X}}^{(m,n)}\right]_{(k,k)} = \frac{1}{2T}\left[R_{\tilde{X}}\left(\frac{k-1}{KT}\right)\right]_{(m,n)}$$

According to (52) and (53), consequently, the LLR is calculated in the following proposition.

Proposition 2: The LLR (48) can be rewritten as $$l(\tilde{Y}) = \sum_{k=1}^{K/2}\sum_{l=1}^{4L} \frac{\tilde{\lambda}_{k,l}}{\sigma^2(\sigma^2+\tilde{\lambda}_{k,l})}\left|\tilde{v}_{k,l}^{\mathcal{H}}\left(I_{4L}\otimes\left(e_k^T W_{\frac{K}{2}}\right)\right)\tilde{Y}\right|^2 \quad (54)$$

where $\lambda'_{k,l}$ and $v'_{k,l}$ are the eigenvalues and the orthonormal eigenvectors of $(I_{4L}\otimes e_k^T)S_{\tilde{X}}(I_{4L}\otimes e_k^T)^T$, $e_k$ is the kth K=2-dimensional standard normal vector, and the operator $\otimes$ denotes the Kronecker product.

Proof: By using the probability density function of the proper-complex Gaussian random vector, the conclusion is directly obtained from (52) and (53).

The proposed detector by using the p-FRESH vectorizer structure is optimal but impractical to implement due to a number of RF chains and ideal brickwall filters. Thus, we propose the practical detector structure by using the over-sampled observation in the next section.

Also, to overcome the problem of the p-FRESH vectorizer structure, the practical detector structure is proposed by using the over-sampled observation in the time domain and block-processing it in the frequency domain. Also, the nearoptimality of the proposed detector is shown by approximation to the optimal detector equipped with p-FRESH vectorizer.

By the Nyquist sampling theorem, the 2L-times oversampling is enough to fully exploit the cyclostationarity in Y (t). After 2L-times over-sampling over 0≤t<KT, the observation vector Y becomes the 2KL-dimensional vector whose lth entry is defined as $Y_l \triangleq Y(t)_{t=1T/(2L)}$ for l=1, 2, . . . , 2KL. Then, the augmented observation vector $Y_A$ and its conversion to the frequency domain are defined as $$Y_A \triangleq \begin{bmatrix} Y \\ Y^* \end{bmatrix} \quad (54)$$

and $$W'Y_A \triangleq \begin{bmatrix} W_{2KL}Y \\ W_{2KL}Y^* \end{bmatrix}$$

where $W' \triangleq I_2 \otimes W_{2KL}$. Similar to the above definitions, X, $X_A$, N, and $N_A$ can be also defined, respectively. The following lemmas provide the approximation of the frequency-domain auto-covariance matrix of the augmented observation vector to that of the total observation vector of the p-FRESH vectorizer.

Lemma 4: Let (K/2)-by-(K/2) matrix $S_{Y_A}^{m,n}$ be obtained after choosing only the ((m−1)K+k)th rows and the ((n−1)K+k)th columns of the auto-covariance matrix of $(I_2\otimes W_{2KL})Y_A$ for k=1, 2, . . . , K/2.

Then, we can approximate $S_{Y_A}^{m,n}$ to the scaled-version of the diagonal matrix $S_{Y_A}^{m,n}$ derived. That is, $S_{Y_A}^{m,n} \approx 4LS_{\tilde{Y}}^{(m,n)}$.

Proof: The detailed proof is omitted here.

Lemma 5: Let SYA be the auto-covariance matrix of the $(I_{4L}\otimes[I_{K/2}, O_{K/2}])W'Y_A$. Then, $S_{YA}$ can be approximated to a block matrix with diagonal blocks and given by $$S_{Y_A} \approx 4LS_{\tilde{Y}} \quad (55)$$

Proof: From Lemma 4, the conclusion follows.

Note that, similar to the above results, we can obtain $S_{Y_A} \approx 4LS_{X'}$ and $S_{N_A} \approx 4LS_{N'}$. The following proposition shows the LLR by using the augmented observation vector $Y_A$.

Proposition 3: The LLR (54) can be rewritten by $$l(Y_A) = \sum_{k=1}^{K/2}\sum_{l=1}^{4L} \frac{\tilde{\lambda}_{k,l}}{\sigma^2(\sigma^2-\tilde{\lambda}_{k,l})}\cdot\left|\tilde{v}_{k,l}^{\mathcal{H}}\left(I_{4L}\otimes\left(e_k^T\left[I_{\frac{K}{2}}\ O_{\frac{K}{2}}\right]\right)\right)W'Y_A\right|^2 \quad (56)$$

where $\lambda'_{k,l}$ and $v'_{k,l}$ are the same in Proposition 2.

Proof: From (53) and (55), we have (56) by using the property of the Kronecker product. In the next section, the detection performance of the resultant detector is examined by numerical results.

Figure 9:
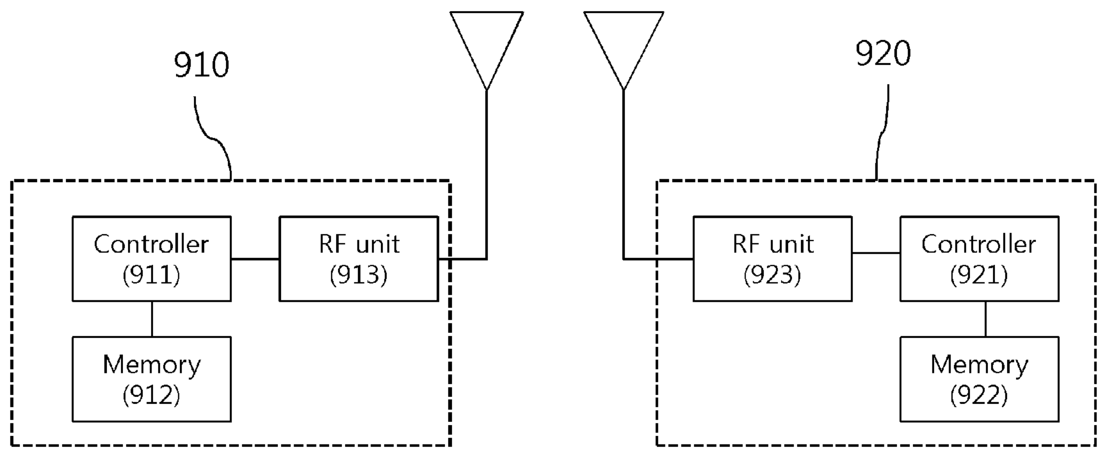
FIG. 9 is a block diagram illustrating a wireless communication system in accordance with one exemplary embodiment of this specification.

FIG. 9 is a block diagram illustrating a wireless communication system in accordance with one exemplary embodiment of this specification.

A base station (BS) 910 may include a controller 911, a memory 912 and a radio frequency (RF) unit 913.

The controller 911 may implement the proposed function, process and/or method. Wireless interface protocol layers may be implemented by the controller 911.

The memory 912 may be connected to the controller 911 to store protocols or parameters. The RF unit 913 may be connected to the controller 911 to transmit and/or receive wireless signals.

A terminal (MS) 920 may include a controller 921, a memory 922 and an RF unit 923.

The controller 921 may implement e proposed function, process and/or method. Wireless interface protocol layers may be implemented by the controller 921.

The memory 912 may be connected to the controller 921 to store protocols or parameters. The RF unit 923 may be connected to the controller 921 to transmit and/or receive wireless signals.

The controller 911, 921 may include an application-specific integrated circuit (ASIC), other chipset, logical circuit and/or data processor. The memory 912, 922 may include a read-only memory (ROM), a random access memory (RAM), a flash memory, a memory card, a storage medium and/or other storage device. The RF unit 913, 923 may include a baseband circuit for processing wireless signals. With a software configuration, the aforesaid mechanism may be implemented by a module (process, functionality, etc.) for performing the functions. The module may be stored in the memory 912, 922 and executed by the controller 911, 921. The memory 912, 922 may be present inside or outside the controller 911, 921, or connected to the controller 911, 921 via a variety of well-known elements.

In this section, we evaluate the detection performance of the proposed detector. Throughout this section, we assume that the primary user linearly modulates uncorrelated BPSK signaling data sequences with excess bandwidth β=0, 1 for given bandwidth B, the overall channel is frequency-selective, and the noise variance is known. The signals down-converted to baseband are over-sampled at over-sampling rate 2L=4 for KT where K=1; 200. Monte Carlo simulations are averaged over 104 experiments per channel generation and also averaged over 10 channel generations.

For β=0, since the BPSK signal degenerates to a WSS random process, the cyclostationarity detection has no gain compared with the energy detection. On the other hand, the impropriety detection as well as the cyclostationarity and impropriety detection outperform the energy detector by utilizing the impropriety. It is also shown that the detection with the estimate of the spectral correlation has almost the same performance as that with the exact spectral correlation.

The BPSK signal with β=1 has both the cyclostationarity and the impropriety of the improper-complex SOCS random signal. Thus, it can be seen that the the cyclostationarity and the impropriety detection schemes both with the ideal spectral correlation and with the estimate spectral correlation all significantly outperform the energy detection and the feature detection that utilizes either the cyclostationarity or the impropriety.

Note that the detection performance of the energy detection does not depend on the excess bandwidth. Note also that, as the excess bandwidth increases, the detection gain from the cyclostationarity becomes larger, while the detection gain from the impropriety is not affected by the excess bandwidth.

As described above, besides the above-described elements, the device according to the present invention basically includes software and hardware, for example, an output unit (display, speaker, etc.), an input unit (keypad, microphone, etc.), a memory, a transmission and reception unit (RF module, antenna, etc.), and the like, required for implementing the technical idea of the present invention. These elements are obvious to the skilled person in the art, so its detailed description will be omitted.

In an exemplary embodiment of the present invention, the above-described method can be implemented by software, hardware or their combination. For example, the method according to the present invention can be stored in a storage medium (for example, an internal memory of a mobile terminal, a flash memory, a hard disk, etc.) and implemented by codes or commands in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for performing properizing frequency shift (p-FRESH) vectorizing, the method comprising:

converting a scalar-valued input signal into a 2L-by-1 vector-valued signal including L signals of the input signal and L complex conjugate signals of the input signal, wherein L is an integer;

modulating the 2L-by-1 vector-valued signal with L different carriers by modulating each of the L signals and the L complex conjugate signals with the L different carriers;

bandpass filtering the modulated 2L-by-1 vector-valued signal to form an output signal; and transmitting the output signal, wherein the output signal is defined by a following expression:

$$Y_l(t) = \begin{cases} (X(t)e^{-2j\pi f_l t}) * g(t), & \text{for } l \le L \\ (X(t)^* e^{-2j\pi f_{l-L} t}) * g(t), & \text{for } l > L \end{cases},$$

where t denotes time, $f_l$ denotes center frequency of an l-th Nyquist zone, X(t) is the input signal, X(t)* is the conjugation of the input signal, g(t) is the impulse response bandpass filtering a half-Nyquist zone(F+), $Y_l(t)$ is the output signal, and l=1, 2, . . . , 2L.

2. The method of claim 1, wherein a fourier transform G(f) of the g(t) is defined by following expression:

$$G(f) = \begin{cases} 1, & \forall f \in \mathcal{F}^+ \\ 0, & \text{elsewhere} \end{cases}.$$

3. The method of claim 1, wherein the input signal has zero-mean, and the output signal is proper-complex zero-mean vector-wide-sense stationary (WSS) process when the reference rate has integer values of the cycle period of the input signal.

4. The method of claim 1, wherein the output signal is jointly wide-sense stationary (WSS), and an auto-correlation function of the output signal has second-order property of the input signal.

5. An apparatus for performing properizing frequency shift (p-FRESH) vectorizing in a wireless access system, the apparatus comprising:

a Radio Frequency (RF) module configured to transceive signals; and a processor configured to control the RF module, wherein the processor is further configured to:

convert a scalar-valued input signal to a 2L-by-1 vector-valued signal including L signals of the input signal and L complex conjugate signals of the input signal, wherein L is an integer, modulate the 2L-by-1 vector-valued signal with L different carriers by modulating each of the L signals and the L complex conjugate signals with the L different carriers bandpass filter the modulated 2L-by-1 vector-valued signal to form an output signal, and transmit the output signal, wherein the output signal is defined by a following expression:

$$Y_l(t) = \begin{cases} (X(t)e^{-2j\pi f_l t}) * g(t), & \text{for } l \le L \\ (X(t)^* e^{-2j\pi f_{l-L} t}) * g(t), & \text{for } l > L \end{cases},$$

where t denotes time, $f_l$ denotes center frequency of an l-th Nyquist zone, X(t) is the input signal, X(t)* is the conjugation of the input signal, g(t) is the impulse response bandpass filtering a half-Nyquist zone(F+), and $Y_l$(t) is the output signal, l=1, 2, . . . , 2L.

6. The apparatus of claim 5, wherein a fourier transform G(f) of the g(t) is defined a following expression:

$$G(f) = \begin{cases} 1, & \forall f \in \mathcal{F}^+ \\ 0, & \text{elsewhere} \end{cases}.$$

7. The apparatus of claim 5, wherein, the input signal has zero-mean, and the output signal is proper-complex zero-mean vector-wide-sense stationary (WSS) process when the reference rate has integer values of the cycle period of the input signal.

8. The apparatus of claim 5, wherein the output signal is jointly wide-sense stationary (WSS), and an auto-correlation function of the output signal has second-order property of the input signal.

* * * * *